(12) United States Patent
Hartland

(10) Patent No.: US 10,583,897 B2
(45) Date of Patent: Mar. 10, 2020

(54) HIGH ANGLE DEPLOYMENT SYSTEM FOR A SEISMIC MARINE SURFACE VESSEL

(71) Applicant: Seabed Geosolutions B.V., Leidschendam (NL)

(72) Inventor: Martin John Hartland, Katy, TX (US)

(73) Assignee: Seabed Geosolutions B.V., Leidschendam (NL)

( * ) Notice: Subject to any disclaimer, the term of this patent is extended or adjusted under 35 U.S.C. 154(b) by 0 days.

(21) Appl. No.: 15/690,956

(22) Filed: Aug. 30, 2017

(65) Prior Publication Data

US 2018/0057114 A1 Mar. 1, 2018

Related U.S. Application Data

(60) Provisional application No. 62/382,567, filed on Sep. 1, 2016.

(51) Int. Cl.
  *B63B 21/66* (2006.01)
  *G01V 1/38* (2006.01)
  (Continued)

(52) U.S. Cl.
  CPC .............. *B63B 21/66* (2013.01); *B63B 27/16* (2013.01); *G01V 1/3843* (2013.01);
  (Continued)

(58) Field of Classification Search
  CPC ... B63B 21/66; B63B 27/36; B63B 2027/165; B63B 2211/02; G01V 1/3843; G01V 1/3852; G01V 1/3808; B63G 2008/007
  See application file for complete search history.

(56) References Cited

U.S. PATENT DOCUMENTS 6,049,507 A 4/2000 Allen
9,389,328 B2 * 7/2016 Schneider ............ G01V 1/3843
(Continued)

FOREIGN PATENT DOCUMENTS

DE 4140201 A1 6/1993
WO 0206146 A1 1/2002
WO 2015049679 A1 4/2015

OTHER PUBLICATIONS

International Search Report and Written Opinion of PCT Patent Application No. PCT/US2017/049355 dated Jan. 25, 2018.

*Primary Examiner* — Anthony D Wiest
(74) *Attorney, Agent, or Firm* — Park, Vaughan, Fleming & Dowler LLP; Shane Nelson

(57) ABSTRACT

A high angle overboard system and method for the deployment of subsea equipment from a marine vessel. The overboard guide system deploys a deployment line from a surface vessel into a body of water at an angle alpha. The angle alpha may be at least 15 degrees and may be greater than 20, 25, 30, 45, or even 60 degrees or more during some or all portions of the subsea operations. The overboard system may be located near the splashzone of the surface vessel or a distance beneath a water surface. The overboard system may take any number of configurations, such as a cone shape, and/or may comprise a plurality of rollers or one or more sheaves. The overboard system allows a subsea device to be operated at higher deployment angles as compared to prior art subsea operations, such as with A-frame LARS systems.

22 Claims, 10 Drawing Sheets

(51) Int. Cl.
  *B63B 27/16*  (2006.01)
  *B63G 8/00*  (2006.01)
(52) U.S. Cl.
  CPC ...... *G01V 1/3852* (2013.01); *B63B 2027/165* (2013.01); *B63B 2211/02* (2013.01); *B63G 2008/007* (2013.01); *G01V 1/3808* (2013.01)

(56) References Cited

U.S. PATENT DOCUMENTS

| | | |
|---|---|---|
| 9,873,496 B2 * | 1/2018 | Rokkan .................. B63B 27/16 |
| 2006/0159524 A1 | 7/2006 | Thompson et al. |
| 2013/0183100 A1 | 7/2013 | Olivier |
| 2014/0348590 A1 | 11/2014 | Thompson et al. |
| 2016/0214694 A1 | 7/2016 | Gateman et al. |

* cited by examiner

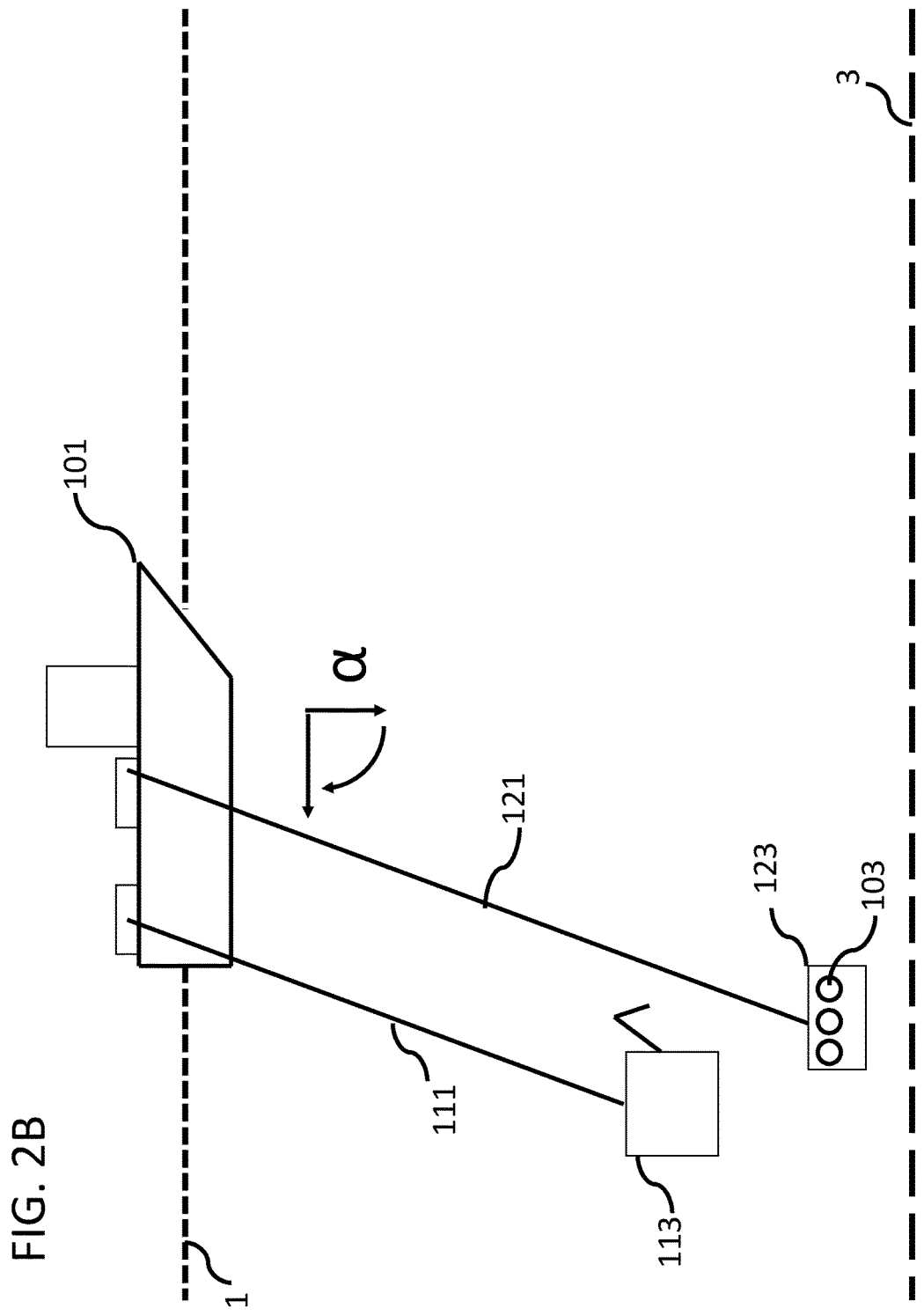

HIGH ANGLE DEPLOYMENT SYSTEM FOR A SEISMIC MARINE SURFACE VESSEL

PRIORITY

This application claims priority to U.S. provisional patent application No. 62/382,567, filed on Sep. 1, 2016, the entire content of which is incorporated herein by reference.

BACKGROUND OF THE INVENTION

Field of the Invention

This invention relates to the deployment and retrieval of subsea equipment (such as a subsea basket or remotely operated vehicle (ROV)) from a marine surface vessel and more particularly relates to the deployment and retrieval of subsea equipment at a high deployment angle.

Description of the Related Art

Marine seismic data acquisition and processing generates a profile (image) of a geophysical structure under the seafloor. Reflection seismology is a method of geophysical exploration to determine the properties of the Earth's subsurface, which is especially helpful in determining an accurate location of oil and gas reservoirs or any targeted features. Marine reflection seismology is based on using a controlled source of energy (typically acoustic energy) that sends the energy through seawater and subsurface geologic formations. The transmitted acoustic energy propagates downwardly through the subsurface as acoustic waves, also referred to as seismic waves or signals. By measuring the time it takes for the reflections or refractions to come back to seismic receivers (also known as seismic data recorders or nodes), it is possible to evaluate the depth of features causing such reflections. These features may be associated with subterranean hydrocarbon deposits or other geological structures of interest.

In general, either ocean bottom cables (OBC) or ocean bottom nodes (OBN) are placed on the seabed. For OBC systems, a cable is placed on the seabed by a surface vessel and may include a large number of seismic sensors, typically connected every 25 or 50 meters into the cable. The cable provides support to the sensors, and acts as a transmission medium for power to the sensors and data received from the sensors. One such commercial system is offered by Sercel under the name SeaRay®. Regarding OBN systems, and as compared to seismic streamers and OBC systems, OBN systems have nodes that are discrete, autonomous units (no direct connection to other nodes or to the marine vessel) where data is stored and recorded during a seismic survey. One such OBN system is offered by the Applicant under the name Trilobit®. For OBN systems, seismic data recorders are placed directly on the ocean bottom by a variety of mechanisms, including by the use of one or more of Autonomous Underwater Vehicles (AUVs), Remotely Operated Vehicles (ROVs), by dropping or diving from a surface or subsurface vessel, or by attaching autonomous nodes to a cable that is deployed behind a marine vessel.

Autonomous ocean bottom nodes are independent seismometers, and in a typical application they are self-contained units comprising a housing, frame, skeleton, or shell that includes various internal components such as geophone and hydrophone sensors, a data recording unit, a reference clock for time synchronization, and a power source. The power sources are typically battery-powered, and in some instances the batteries are rechargeable. In operation, the nodes remain on the seafloor for an extended period of time. Once the data recorders are retrieved, the data is downloaded and batteries may be replaced or recharged in preparation of the next deployment. Various designs of ocean bottom autonomous nodes are well known in the art. See, e.g., U.S. patent Publication No. US20160041280 (citing patents and publications), incorporated herein by reference. Still further, the autonomous seismic nodes may be integrated with an AUV such that the AUV, at some point subsea, may either travel to or from the seabed at a predetermined position. See, e.g., U.S. Pat. No. 9,090,319, incorporated herein by reference. In general, the basic structure and operation of an autonomous seismic node and a seismic AUV is well known to those of ordinary skill.

Marine seismic surveys need a fast and cost-effective system for deploying and recovering autonomous seismic receivers that are operate underwater, such as on the seabed. In general, ROVs or underwater baskets that are used to deploy autonomous seismic nodes are connected to a surface vessel by a deployment line (e.g., the tether, cable, rope, or wire connected the subsea equipment to the vessel). In general, surface vessels require a guide cursor system (illustrated in FIG. 1A and described in more detail later in this disclosure) installed on the side of the vessel to facilitate a launch and recovery system (LARS) for a ROV from colliding with the vessel during lowering and raising through the splash zone around a vessel. Other deployment systems use a traditional A-frame system (as illustrated in FIG. 1B) without utilizing a guide cursor system.

When a subsea equipment (whether ROVs, cages, or seismic nodes, etc.) is deployed from the surface vessel, the deployment line is deployed from the vessel at a certain deployment angle alpha (α). Existing systems do not tolerate much more than a 15-degree angle for the deployment cables, particularly systems that utilize an A-frame deployment system. A high deployment angle from the surface vessel causes numerous problems on the deployment equipment and is a key operational limitation for the overall survey. In particular, the surface vessel cannot operate above a particular speed or deploy equipment at a certain depth or direction if such an operational angle exceeds the system's requirements. This decreases the overall speed of the survey, which increases the overall survey costs.

A need exists for an improved method and system for deploying and retrieving subsea equipment from a surface vessel at a higher angle from the surface vessel. A need exists for an improved overboard guide system that facilitates deployment and/or maintains contact between the deployment line and the guide system at a plurality of directions and angles of the deployment line.

SUMMARY OF THE INVENTION

A high angle overboard system and method for the deployment of subsea equipment from a marine vessel. The overboard guide system deploys a deployment line from a surface vessel into a body of water at an angle alpha. The angle alpha may be at least 15 degrees and may be greater than 20, 25, 30, 45, or even 60 degrees or more during some or all portions of the subsea operations. The overboard system may be located near the splashzone of the surface vessel or a distance beneath a water surface. The overboard system may take any number of configurations, such as a cone shape, and/or may comprise a plurality of rollers or one or more sheaves. The overboard system allows a subsea device to be operated at higher deployment angles as compared to prior art subsea operations, such as with A-frame LARS systems.

Disclosed is a high angle overboard apparatus for the deployment of subsea equipment from a marine surface vessel, such as an ROV or subsea cage or basket or other seismic (or non-seismic) payload. In one embodiment, the overboard guide apparatus is configured to deploy a deployment line from a surface vessel into a body of water at an angle alpha, wherein the deployment line is coupled to a subsea device, wherein the angle alpha is approximately 15 degrees or greater, such as 20, 25, 30, 45, or even 60 degrees. The deployment line may be routed through an overboard guide cursor system or an A-frame LARS system located on the back deck of the marine vessel. The overboard guide apparatus may be located either near the splashzone of the surface vessel or a distance X beneath a water surface, or otherwise proximate to a side of the surface vessel.

The overboard guide apparatus may have a first opening and a second opening, wherein the deployment line is configured to enter the overboard guide apparatus through the first opening and exit the overboard guide apparatus through the second opening. The overboard guide apparatus may be substantially in the shape of a cone. A plurality of rollers may be coupled to a portion of the overboard guide apparatus, such as an interior or exterior portion. The overboard guide apparatus may have at least one sheave. In other embodiments, it may comprise a plurality of sheaves, wherein at least a first sheave is arranged opposite to a second sheave. The overboard guide apparatus may be configured to deploy the deployment line approximately 360 degrees around the surface vessel. The overboard guide apparatus may be configured to change its position in response to a force of the deployment line or to maintain a substantially continuous contact between the overboard guide apparatus and the deployment line.

Also disclosed is a high angle overboard system for the deployment of subsea equipment from a marine surface vessel. The system may comprise an A-frame deployment system located on the back deck of a marine surface vessel and configured to deploy a subsea device connected to a deployment line from the surface vessel and an overboard guide apparatus configured to deploy the deployment line into a body of water at an angle alpha approximately 15 degrees or greater, wherein the overboard guide apparatus is located proximate to a side of the surface vessel.

Also disclosed is a method for the deployment of subsea equipment from a marine vessel. The method may comprise deploying a subsea device from a surface vessel into a body of water, coupling a deployment line to an overboard guide system, and deploying the deployment line into the body of water at an angle alpha from the overboard guide system, wherein the angle alpha is approximately 15 degrees or greater. In one embodiment, the subsea device is coupled to a deployment line and the overboard guide system is located proximate to a side of the surface vessel. The method may further comprise performing subsea operations with the subsea device while the deployment angle alpha is at least 15 degrees. The method may further comprise operating the surface vessel in a direction wherein a line of action of the deployment line continuously contacts the overboard guide system. The method may further comprise maintaining substantially continuous contact between the overboard guide system and the deployment line. The method may further comprise automatically positioning the overboard guide system in response to a force of the deployment line on the overboard guide system. The method may further comprise deploying the subsea device from an A-frame deployment system located on the back deck of the marine vessel.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

FIG. 2B illustrates another embodiment of a deployment system from a marine vessel.

DETAILED DESCRIPTION

Various features and advantageous details are explained more fully with reference to the nonlimiting embodiments that are illustrated in the accompanying drawings and detailed in the following description. Descriptions of well known starting materials, processing techniques, components, and equipment are omitted so as not to unnecessarily obscure the invention in detail. It should be understood, however, that the detailed description and the specific examples, while indicating embodiments of the invention, are given by way of illustration only, and not by way of limitation. Various substitutions, modifications, additions, and/or rearrangements within the spirit and/or scope of the underlying inventive concept will become apparent to those skilled in the art from this disclosure. The following detailed description does not limit the invention.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures, or characteristics may be combined in any suitable manner in one or more embodiments.

Figure 1A:
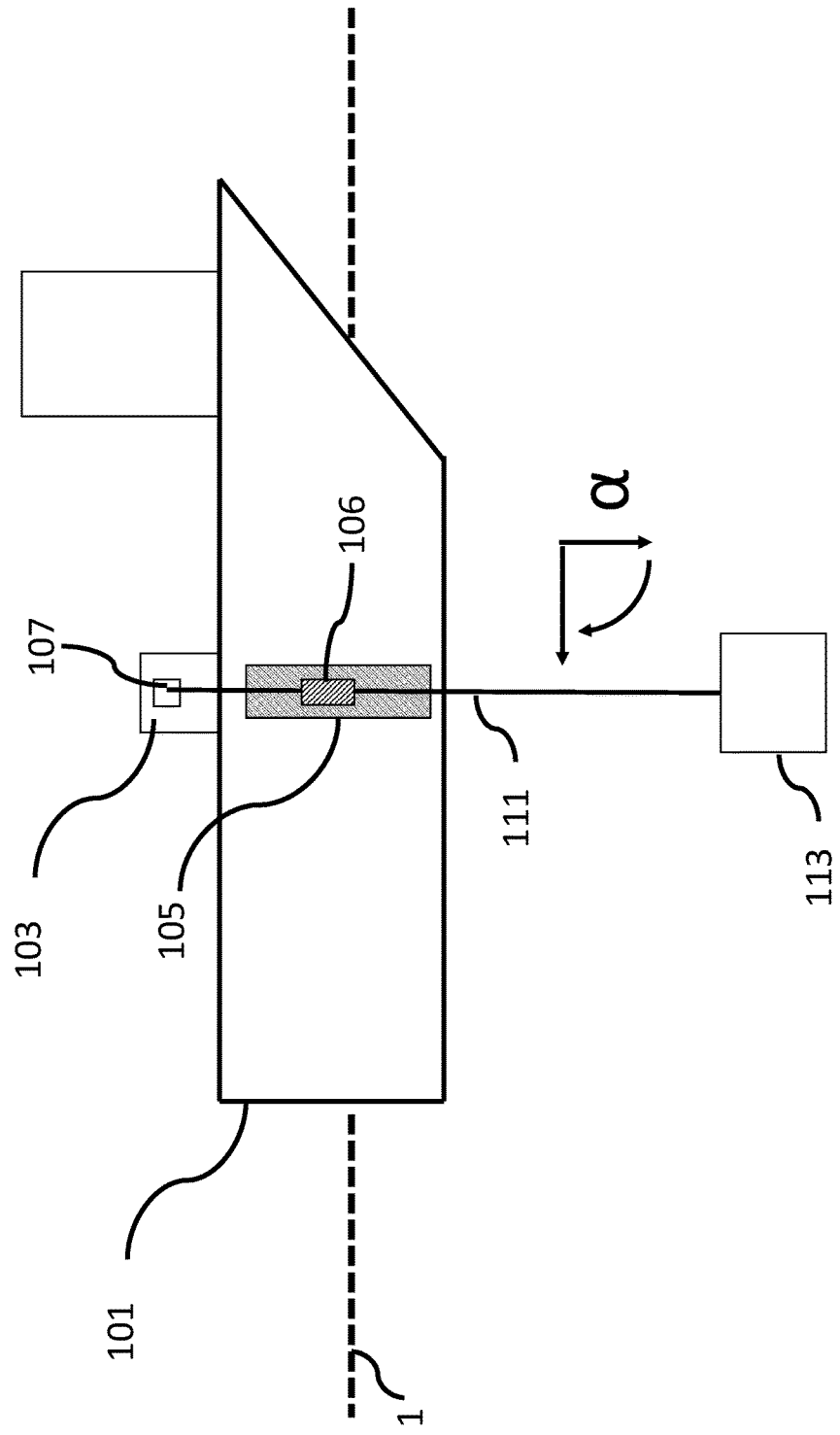
FIG. 1A illustrates one embodiment of a prior art guide cursor system.

It is well known in the art that the deployment of subsea equipment from a marine surface vessel has to be performed under the operational constraints and/or limitations of (among other items) the over-boarding system. One such overboard system is a guide cursor system, and is generically described in FIG. 1A. Another such overboard system is a traditional A-frame LARS system, and is generically described in FIG. 1B. FIG. 1A illustrates a partial view looking at a side of the vessel, while FIG. 1B illustrates a partial view while looking down the side of the vessel.

Figure 1B:
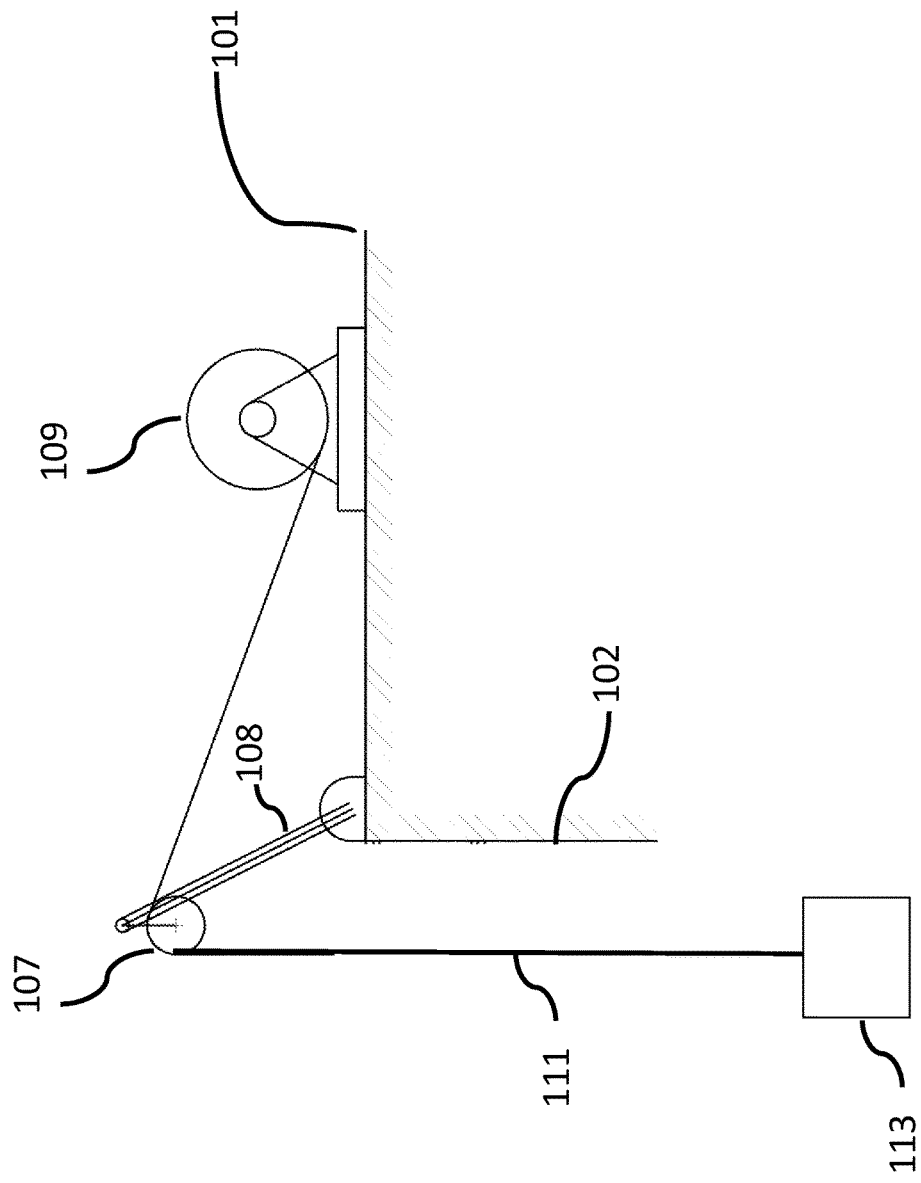
FIG. 1B illustrates one embodiment of a prior art A-frame deployment system.

Referring to FIGS. 1A and 1B, subsea equipment 113 may be deployed from surface vessel 101 from the surface of a water body, such as sea surface 1. Surface vessel 101 is shown in a simplified version in FIG. 1A, and one of skill in the art will realize that many more components may be located on the back deck of the vessel for standard vessel operations. For example, for the deployment of autonomous seismic nodes, a node deployment system and a node storage system may be required on the back deck, such as one described in U.S. Pat. No. 9,459,366, incorporated herein by reference. For the purposes of this disclosure, if a seismic surface vessel is utilized, the described invention is not limited to the particular type of node deployment and/or storage system utilized on the back deck of the vessel. Instead, the present disclosure generally relates to how certain subsea equipment (such as ROVs or subsea baskets) may be lowered and/or raised from the surface vessel, such as during a seismic survey operation and/or other marine operation. In one embodiment, such subsea equipment is utilized for the deployment of autonomous seismic nodes in the ocean, such as that described in U.S. Publication Nos. US2015/0316675 and 2016/0121983, incorporated herein by reference. While various ROVs and other subsea devices may be used with the embodiments presented in this disclosure, the invention is not limited to any particular underwater vehicle or configuration thereof to deploy the autonomous seismic nodes on the seabed. Further, while one application of the present disclosure is directed to ROVs and subsea baskets/cages used for seismic node deployment in a body of water (such as on the seabed), the present disclosure is not limited to such an application or subsea device.

As shown in FIGS. 1A and 1B, subsea device/equipment 113 may be coupled to the surface vessel while in the water via deployment line 111, such as a tether, cable, wire, or rope, as is known in the prior art. While not illustrated for simplicity purposes, for some types of subsea equipment (such as an ROV), the deployment line may consist of separate sections, such as a tether section and an umbilical section. For example, as is known in the art, if subsea equipment 113 is an ROV (such as the FUGRO FCV3000 or other similar ROV), the ROV is coupled to a tether management system (TMS) via a first wire segment (or tether) and the TMS is connected to the surface vessel via a second wire segment (such as an umbilical cable). In general, for the purposes of this disclosure, some or all of the portions of an ROV's tether and/or umbilical cable (or other similar subsea device) may be generally considered as the ROV's deployment line. As is known in the art, the TMS is coupled to the ROV during lowering and/or raising of the ROV through the splash zone from the surface vessel. The TMS has a tether winch that may lengthen and/or shorten the tether as appropriate. The umbilical cable provides power and data signals between the surface vessel and the TMS. The TMS relays data signals and/or power for the ROV through the tether line. Also, multiple ROVs and/or other subsea equipment may be operated from a single vessel at the same time, such that each subsea device may have a corresponding deployment line, tether, TMS, and/or umbilical cable/line, as well as a separate LARS system. In general, for the purposes of this disclosure, the present disclosure may apply to a wide variety of deployment lines and/or connecting cables between the subsea device and the surface vessel.

One or more launch and recovery systems (LARS) 103 may be located on the back deck of the vessel, which may be used to deploy and recover the subsea equipment. A more detailed view of a traditional A-frame LARS system is shown in FIG. 1B. Guide cursor system 105 is typically installed on the side of the vessel 101 and is used to ensure controlled clearance with the vessel side during lowering and raising of the subsea equipment (e.g., ROV, cage, etc.) through the splash zone. In one embodiment, cursor system 105 is configured to prevent contact between the subsea equipment (and deployment line) and the surface vessel. The guide system may be a series of rails or bars (such as a ladder) on the side of the vessel over which moving mechanism 106 rides up and down. Moving mechanism 106 may be attached to deployment line 111 and/or subsea equipment 113. Because the subsea equipment is attached to the moving mechanism, the subsea equipment typically moves up and down the guide cursor system without contacting the surface vessel. The guide cursor system is not particularly concerned about the deployment angle and is instead focused on making sure that subsea equipment 113 does not physically contact (or at least minimizes the contact) the vessel during raising and lowering into the splash zone.

In general, the angle alpha ($\alpha$) is the deployment angle the deployment line makes with the surface vessel as measured from a vertical line perpendicular with the surface vessel as it sits on the water surface. In other words, if the subsea device is immediately beneath the surface vessel with the deployment line connecting the subsea device and the surface vessel in a substantially vertical position, then the angle alpha is approximately zero (which is the position shown in FIG. 1A). If the subsea device is immediately behind (or in front) of the surface vessel (e.g., if the subsea device was being towed approximately on the water surface) with the connecting deployment line in a substantially horizontal position, then the angle alpha is approximately 90 degrees. The relative speed and distance between the ship and the subsea device dictates the angle alpha.

Referring now to FIG. 1B, a traditional A-frame LARS system is illustrated on the back deck of surface vessel 101 by the deployment of a deployment line 111 over a side 102 of the surface vessel. In general, the angle of the deployment line is controlled and/or handled from sheave or pulley system 107 on the LARS system, which is on the back deck of the marine vessel. The LARS system includes winching system 109 for lowering and/or raising deployment line 111. Pulley system 107 may be part of and/or coupled to heave compensated crane 108. As shown in FIG. 1B, conventional pulleys 107 on the LARS system are oriented perpendicular to the vessel. This orientation is necessary for the initial deployment and recovery of subsea equipment to be away from the vessel, but does not help for any deployment angle problems. Traditional A-frames may be able to handle a deployment angle approximately up to 15 degrees or so for some deployments, but cannot accept such angles for a long-term load situation and cannot handle higher deployment angles. For higher deployment angles (such as more than 15 or 20 degrees), the increased force (at an increased angle) from the deployment line is greater than the pulley/overboard system can handle.

Existing overboard systems do not tolerate high deployment angles and all operations are limited by this maximum deployment angle alpha. Thus, the surface vessel cannot operate above a particular speed or deploy equipment at a certain depth if such an operational angle exceeds the system's requirements. This decreases the overall speed of the survey, which increases the survey costs.

Figure 2A:
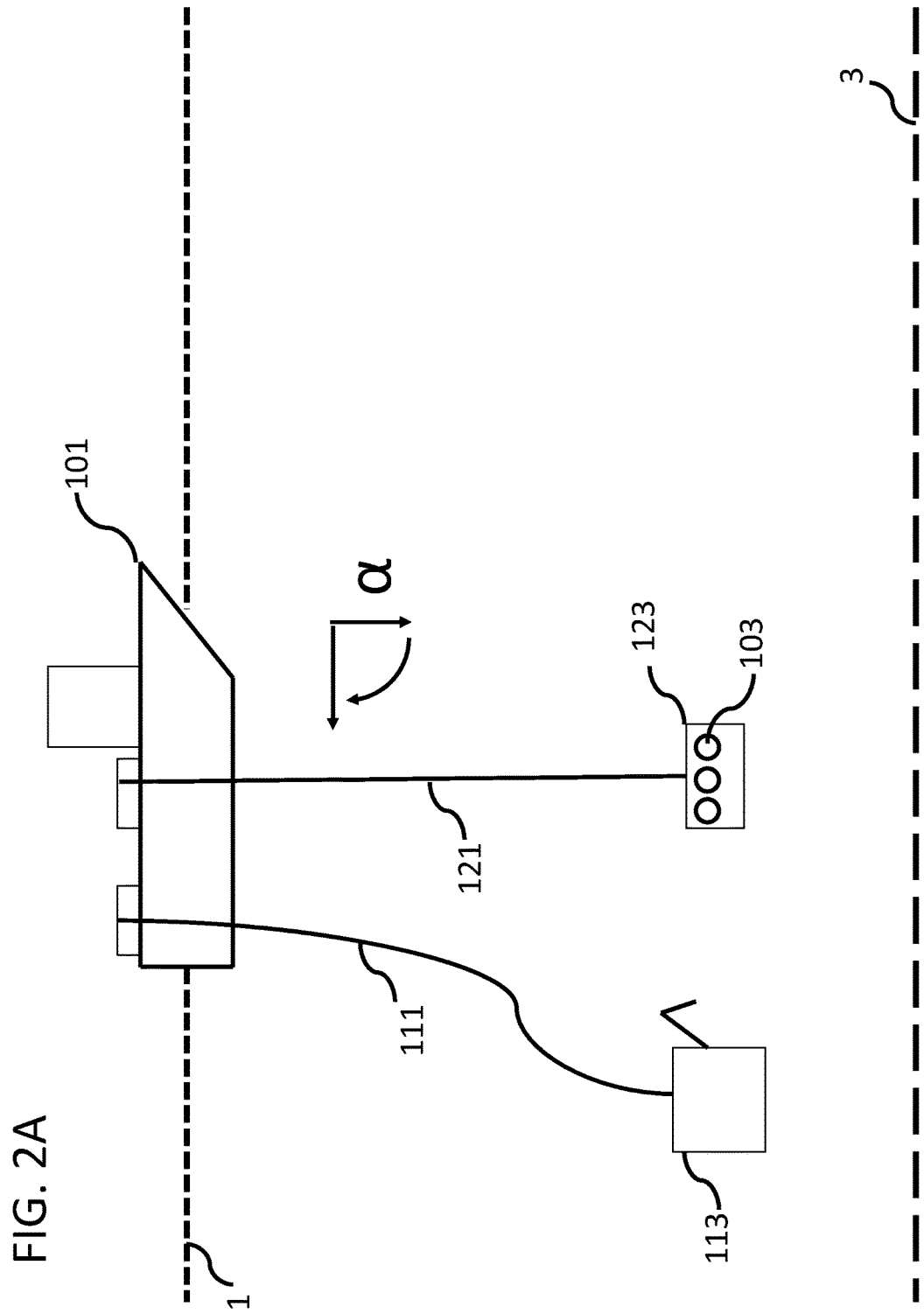
FIG. 2A illustrates one embodiment of a deployment system from a marine vessel.

FIGS. 2A and 2B illustrate one embodiment of a deployment system from a marine vessel. The illustrated deployment lines are simplified for ease of comparison. FIG. 2A illustrates an embodiment where the surface vessel is travelling at a first speed and/or deploying the subsea equipment at a first depth such that the deployment line (e.g., the tether, cable, rope, or wire connected the subsea equipment to the vessel) is deployed from the vessel at a first angle alpha (α). FIG. 2B illustrates an embodiment where the surface vessel is travelling at a second speed and/or deploying the subsea equipment at a second depth such that the deployment line (e.g., the tether, cable, rope, or wire connected the subsea equipment to the vessel) is deployed from the vessel at a second angle alpha (α). In this embodiment, the angle alpha is greater in FIG. 2B as compared to the angle alpha in FIG. 2A. If the surface vessel is not moving (or not moving fast) as compared to the subsea equipment (as shown in FIG. 2A), the angle alpha is not significant. However, as shown in FIG. 2B, in various deployment operations the angle alpha may be large. This is particularly true when the seismic nodes or subsea equipment is operated in deep water locations (such as 3000-5000 meters) as well as when the vessel is moving fast. In general, the greater the depth or the speed of the vessel, the greater the deployment angle alpha. As mentioned above, a high deployment angle from the surface vessel causes numerous problems and is an operational limitation.

The embodiments described in relation to FIGS. 2A and 2B illustrate a seismic operation for the deployment of autonomous seismic nodes to the seabed using at least one ROV 113 and at least one basket/cage 123. Of course, other subsea devices may be utilized with the high angle deployment system of the present disclosure. In one embodiment, surface vessel 101 deploys subsea cage/basket 123 to a position on or near the seabed, or at some position subsea between the surface vessel and the seabed. In some embodiments, two or more subsea baskets may be deployed from the vessel. Subsea basket 123 may be utilized near the surface, at a subsea position between the seabed and the surface, near the seabed, or on the seabed. Basket/cage 123 may be lowered from surface vessel 101 via wire/cable 121 with a plurality of autonomous seismic nodes 103 (or other seismic payload devices) stored on the basket/cage for transfer with one or more ROV(s) 113, such as disclosed in U.S. Pat. No. 6,975,560 and U.S. Patent Publication No. 2016/0121983, each incorporated herein by reference. ROV 113 may be used to transfer seismic nodes 103 from cage 123 and deploy those seismic nodes to seabed 3 at predetermined positions. In one embodiment, the ROV may have a skid or other node storage system for storing a plurality of autonomous seismic nodes on the ROV. An ROV node storage system may be located on an underside of the ROV or may be located on a front, back, or side portion of the ROV. In some embodiments, the nodes may be stored and/or handled by a plurality of grabbers, grippers, manipulators, or other single node handling devices. The present disclosure is not limited to any particular node holding device or node transfer device or basket coupling device. In other words, the nodes may be transferred to and from the baskets and the ROVs (and/or from the baskets to the seabed) in any number of configurations. In other embodiments, an autonomous underwater vehicle (AUV) or another unmanned underwater vehicle (UUV) may be used instead of an ROV.

Figure 3:
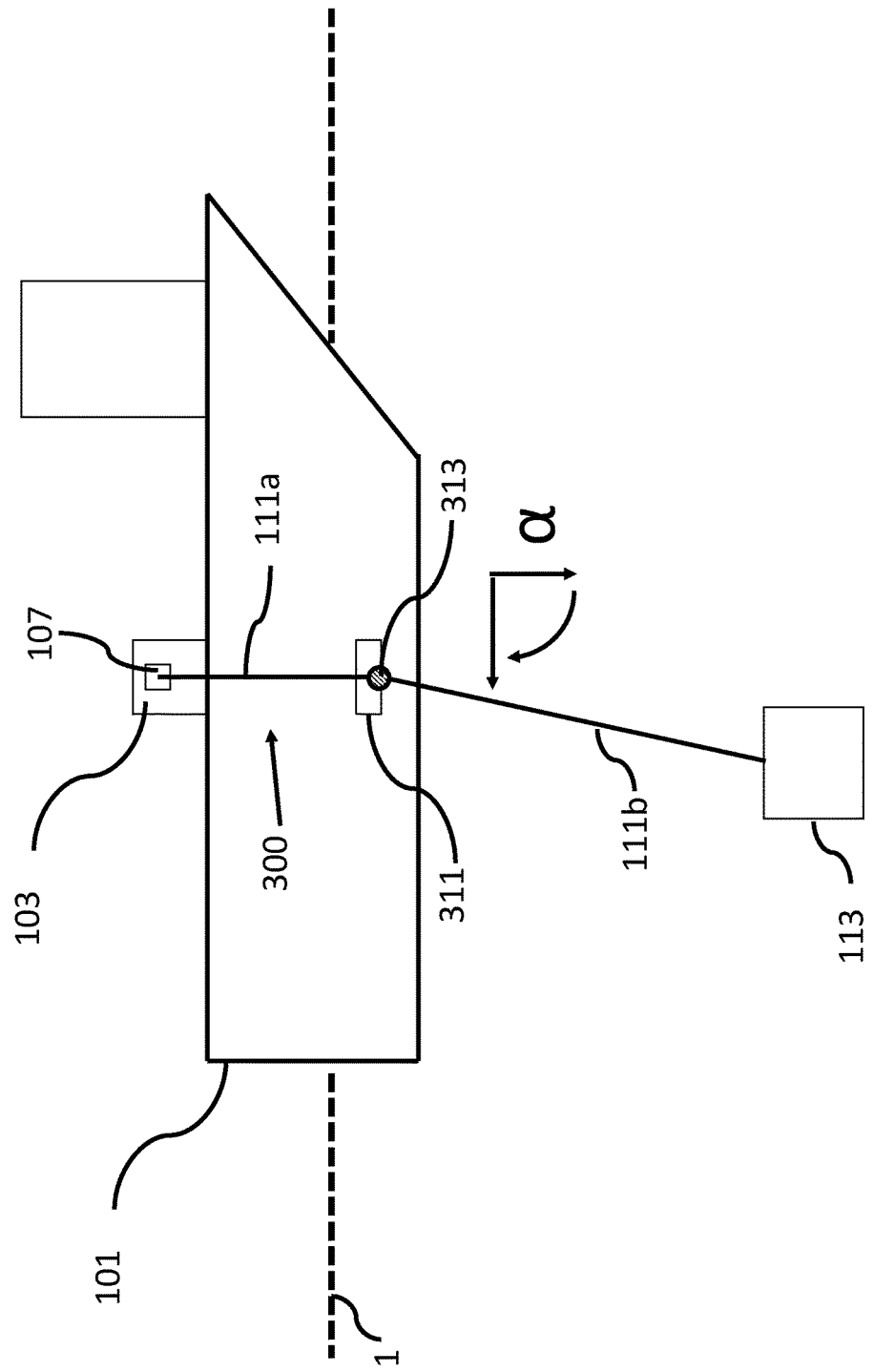
FIG. 3 illustrates one embodiment of a high angle overboard guide system.

FIG. 3 illustrates one embodiment of a high angle overboard guide system according to the present disclosure. A surface vessel may have one or more such guide systems to deploy each subsea equipment. In one embodiment, overboard system 300 is a high angle overboard guide system configured for high angle deployment from the side of surface vessel. In some embodiments, it may comprise and/or be coupled to a conventional guide cursor system (such as that described in relation to FIG. 1A) or a conventional A-frame system (such as that described in relation to FIG. 1B). Thus, in one embodiment, overboard system 300 comprises overboard guide system 311 and A-frame system 103. As described above, subsea equipment 113 may be any number of subsea devices, but in one embodiment may be an ROV or subsea cage/basket.

In one embodiment, overboard guide system 311 acts as a high angle overboard system and is configured to allow the deployment line to be deployed from the surface vessel at angles much greater than possible in conventional deployment systems. In some embodiments, angle alpha may be as high as 15, 20, 25, 35, or 45 or more degrees without causing operational errors on the overboard guide system. In one embodiment, high angle overboard guide system 311 may be located at or near the bottom of guide cursor system (such as guide cursor 105 shown in FIG. 1A). In other embodiments, high angle overboard guide system 311 may be detached from the cursor system and/or be located further on the side of the vessel. For example, the overboard guide system 311 may be located either near the splashzone of the surface vessel or a distance X beneath a water surface. In one embodiment, a first portion 111a of the deployment line 111 may extend between LARS system 103 and overboard guide system 311, and a second portion 111b may extend between overboard guide system 311 and subsea device 113.

High angle guide system 311 and/or guide angle device 313 may comprise a wide variety of shapes and/or configurations. In one embodiment, guide system 311 may comprise angle device 313, which may be a cone or rotatable pulley or other similar device configured for movement of the deployment line in a variety of directions and a variety of angles during deployment and/or operation of the subsea equipment from the surface vessel. In one embodiment, overboard guide system 311 is configured to minimize stress and force on deployment line 111 and guide system 300 as the deployment line is deployed in the water.

FIGS. 4A, 4B, 4C, and 4D show various embodiments of guide angle device 313 from FIG. 3. Of course, other devices may similarly be used by one of skill in the art.

Figure 4B:
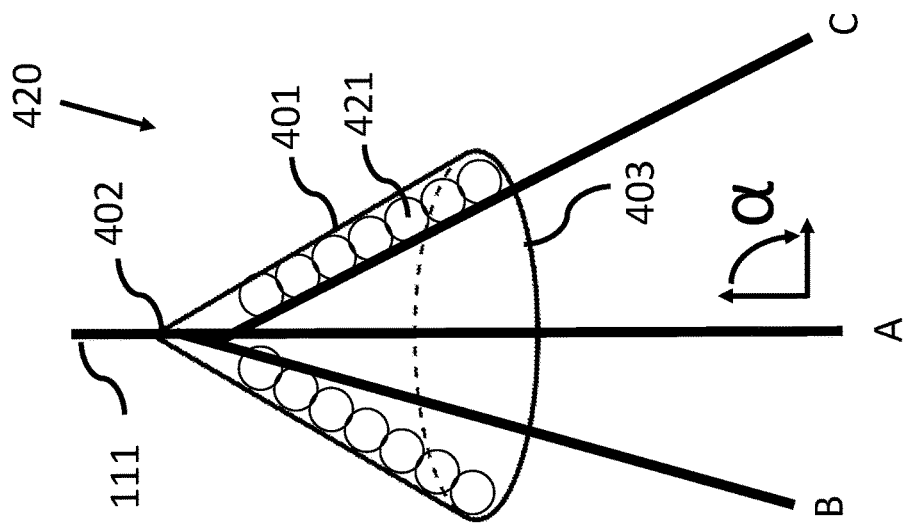
FIGS. 4A, 4B, 4C, and 4D illustrate various embodiments of a high angle overboard guide system.
Figure 4A:
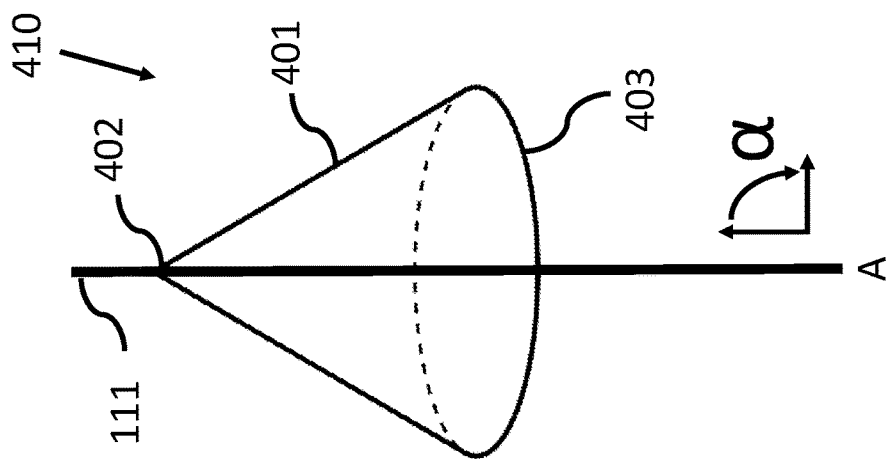

FIG. 4A shows one example of a guide angle device and/or system in the shape of a cone. In this embodiment, guide system 410 may be in the form of a cone shaped body 401 with a first or upper opening 402 to allow deployment line 111 to enter the cone and a second or lower opening 403 to allow deployment line 111 to exit the cone. The edges of both openings may be rounded or beveled to limit or prevent friction on the deployment line during contact with the cone. This cone configuration allows the bottom portion of deployment line 111 to exit the cone at relatively large angles. In one embodiment, the limits of angle alpha relate to the shape of the cone and, more particularly, the exit opening of the cone as compared to the height of the cone. The larger the diameter of the base/opening of the cone the greater the deployment angle. In one embodiment, the cone structure described in FIG. 4A provides a 360-degree contact surface for the deployment line, which allows the deployment line to be deployed from the surface vessel from any direction (e.g., full 360-degree deployment). Of course, the high angle guide system is not limited to a cone structure, but can have many other structures, such as a funnel, a toroid, a cuboid, etc. In one embodiment, a rectangular box shape may be used with an opening section that is smaller than an exit section, which, similar to the cone shape described above, allows the deployment line to operate at high angles relative to the surface vessel. In FIG. 4A deployment line 111 is shown in Position A, which is a substantially vertical position of the deployment line relative to the ocean surface.

In another embodiment, as shown in FIG. 4B, the cone shaped body 401 may comprise or be coupled to a plurality of rollers, ball bearings, or similar friction limiting devices 421 on the inner surface of the cone. High angle guide system 420 described in FIG. 4B may be substantially similar to that described in FIG. 4A but includes one or more of friction limiting devices 421. In one embodiment, the plurality of friction limiting devices 421 comprises a plurality of rollers that move based on contact with an external object, such as the deployment line. Rollers 421 allow deployment line 111 to move within cone 401 with greater flexibility and less friction. In some embodiments, only the entrance section 402 and exit section 403 of the cone 401 have one or more rollers 421, which are the places on the cone with the greatest force potential on the deployment line 111 and the guide system. In still other embodiments, only the exit section 403 has one or more rollers 421 located close to or on the edge to the cone exit 403. While FIG. 4B only shows a partial cross section of the cone with corresponding exemplary rolling devices, one of skill in the art will realize that the rollers may be arranged at various patterns or angles within the cone body for optimized positioning of the rollers. In one embodiment, a majority or substantially all of the interior surface of the cone comprises rollers 421. In other embodiments, a majority or substantially all of the edge of cone exit section 403 comprises rollers 421. In some embodiments, the entrance section 402 of the cone may have a toroid or other similarly "O" shaped roller that facilitates movement of the deployment line through the cone in a plurality of directions. In FIG. 4B deployment line 111 is shown in various potential positions. Position A shows deployment line 111 in a substantially vertical position relative to the ocean surface, while Position B shows deployment line 111 with a first angle and Position C shows deployment line 111 with a second angle. As easily seen, the deployment line angle of Position C is greater than the deployment line angle of Position B. In one embodiment, as the deployment line angle alpha increases, the deployment line contacts a greater number of the plurality of rollers 421 and/or sides/edges of high angle guide system 420.

Figure 4D:
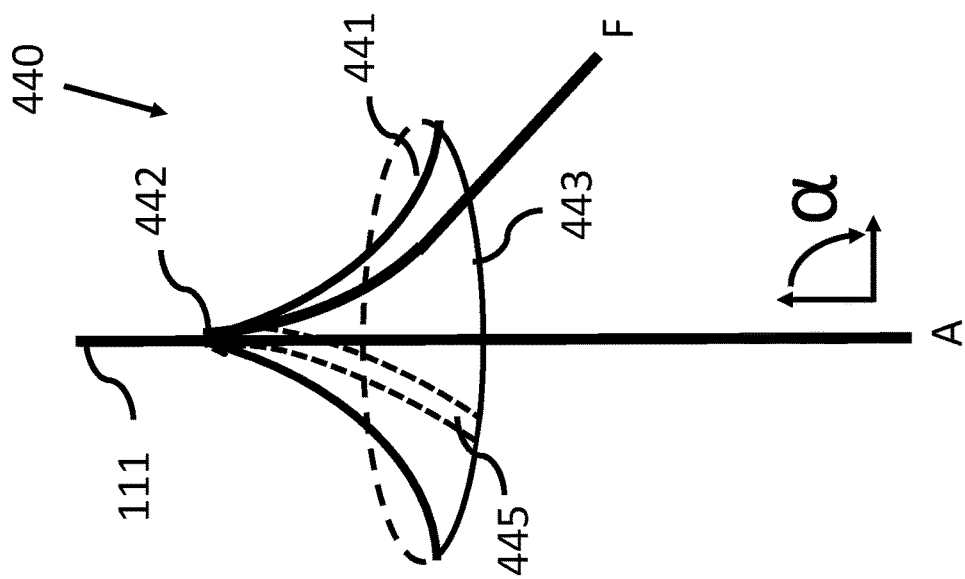
Figure 4C:
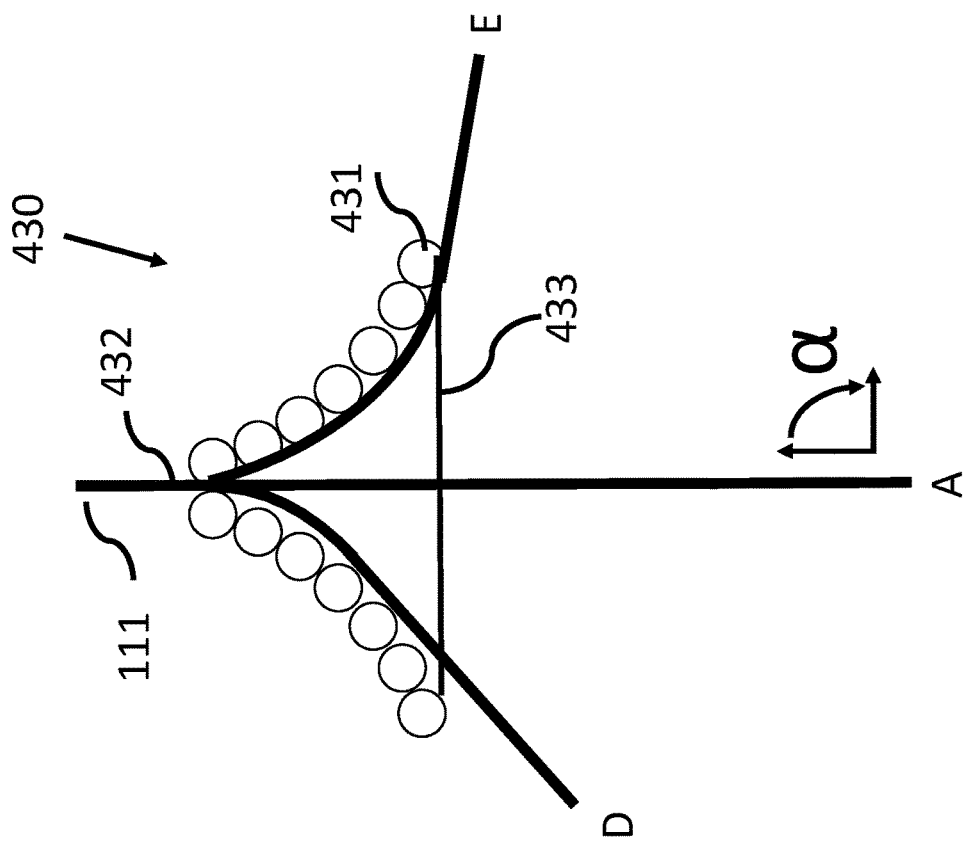

In another embodiment, as shown in FIG. 4C, rather than having a particular shaped body (such as a cone) to which a plurality of rollers is fixed, high angle overboard system 430 may comprise a plurality of rollers 431 (or other similar friction limiting devices) arranged in a particular pattern which as a whole may form a particular shape. For example, as shown in FIG. 4C, a plurality of rollers 431 may be arranged where the exit opening flares out such that the sides are not substantially straight (as may be the case in a substantially cone shaped structure). This flared out arrangement provides a better contact surface for the deployment line at all angles, as there are multiple angles that deployment line 111 may contact a roller 431 surface. The flared configuration may also comprise a substantially elliptical, parabolic, or exponential shape. The rollers may be coupled to each other in a mesh or wire arrangement, or may be simply welded or rigidly connected to each other in a particular configuration. In some embodiments, the flared roller configuration displayed in FIG. 4C can be provided in a substantially cone shaped outer structure. In other embodiments, some of the rollers 431 may be coupled by a connecting member 433 to provide support to the overboard system. In FIG. 4C deployment line 111 is shown in various potential positions. Position A shows deployment line 111 in a substantially vertical position relative to the ocean surface, while Position D shows deployment line 111 with a first angle and Position E shows deployment line 111 with a second angle. As easily seen, the deployment line angle of Position E is greater than the deployment line angle of Position D. In one embodiment, as the deployment line angle alpha increases, the deployment line contacts a greater number of the plurality of rollers 431 and/or sides/edges of the high angle guide system 430.

In another embodiment, as shown in FIG. 4D, guide system 440 may be in the form of a cone shaped body 441 (similar to FIG. 4A) but with curved and/or flared sides. For example, body 441 may have a first or upper opening 442 to allow deployment line 111 to enter the cone and a second or lower opening 443 to allow deployment line 111 to exit the cone. The body may be arranged such that the exit opening is flared out (e.g., the sides are not substantially straight and curve outwards). The edges of both openings may be rounded or beveled to limit or prevent friction on the deployment line during contact with the body. Similar to FIG. 4C, this flared out arrangement provides a better contact surface for the deployment line at all angles, as there are multiple angles that deployment line 111 may contact a surface of cone body 441. The flared configuration may also comprise a substantially elliptical, parabolic, or exponential shape. In one embodiment, the curvature radius of the body 441 is greater than the minimum dynamic bend radius of a portion of the deployment line as it exits the overboard guide, such as the main lift umbilical of the deployment line. In one embodiment, cone body 441 is formed of a curved steel plate that is bent into the desired radius. In some embodiments, body 441 may be coupled to one or more rollers to facilitate movement of the deployment line within the guide. In one embodiment, a portion of the overboard guide system 440 may be open so that the deployment line can be inserted into (and/or otherwise coupled to) the guide after or during certain deployment operations (such as after an ROV has been initially inserted into the water). For example, the guide 440 may be partially open and/or have an opening on the outboard side (such as open portion 445), which may be sized and arranged to allow an umbilical or deployment line to enter into the guide 440. In one embodiment, the speed of the vessel may be slow and the direction of the subsea device and/or surface vessel oriented such that a portion of the deployment line enters open guide portion 445. After the deployment line (e.g., umbilical cable) is restrained within the guide the vessel can speed back up to maximum operating speed. In some embodiments, the overboard guide 440 may be designed to rotate to facilitate placement of the deployment line within the guide 440. In FIG. 4D deployment line 111 is shown in various potential positions. Position A shows deployment line 111 in a substantially vertical position relative to the ocean surface, while Position F shows deployment line 111 with a large deployment angle. In one embodiment, as the deployment line angle alpha increases, the deployment line contacts a greater number of the sides/edges of the high angle guide system 440.

Figure 5A:
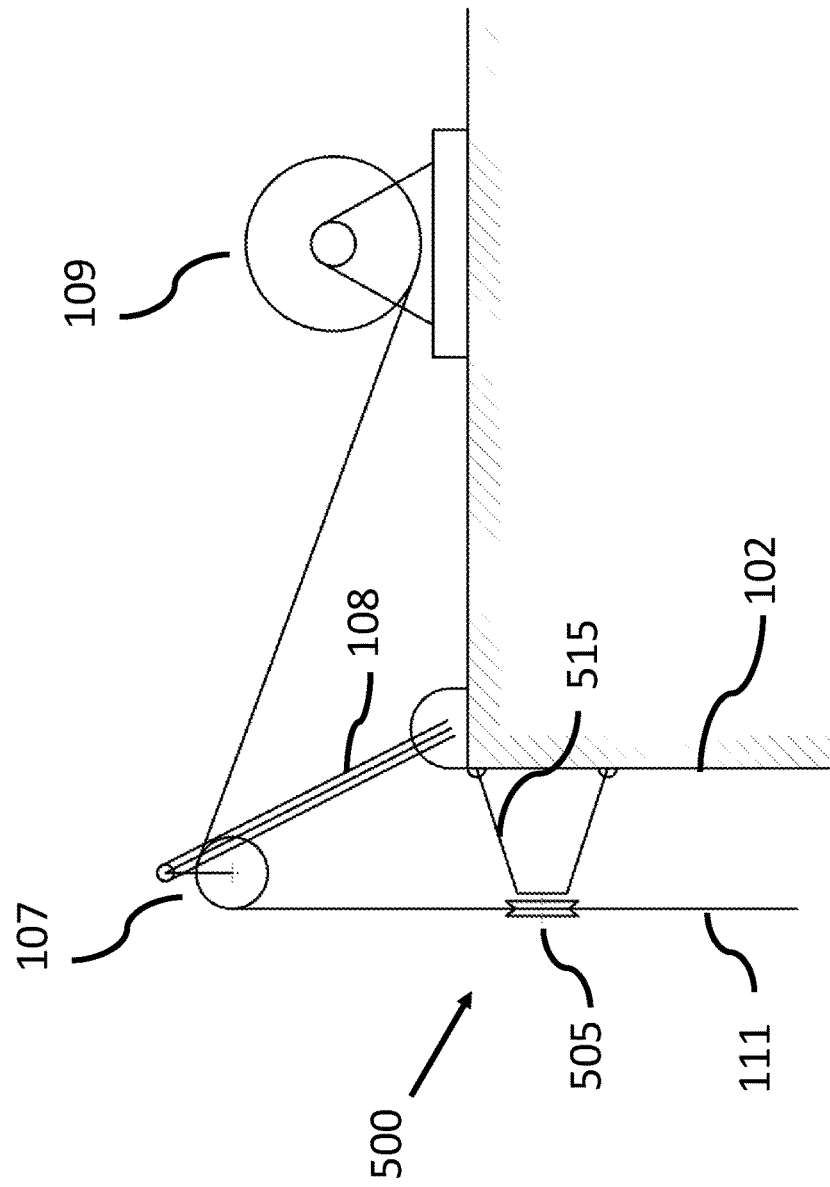
FIGS. 5A, 5B, and 5C illustrate various embodiments of a high angle overboard guide system using overboard sheaves.
Figure 5B:
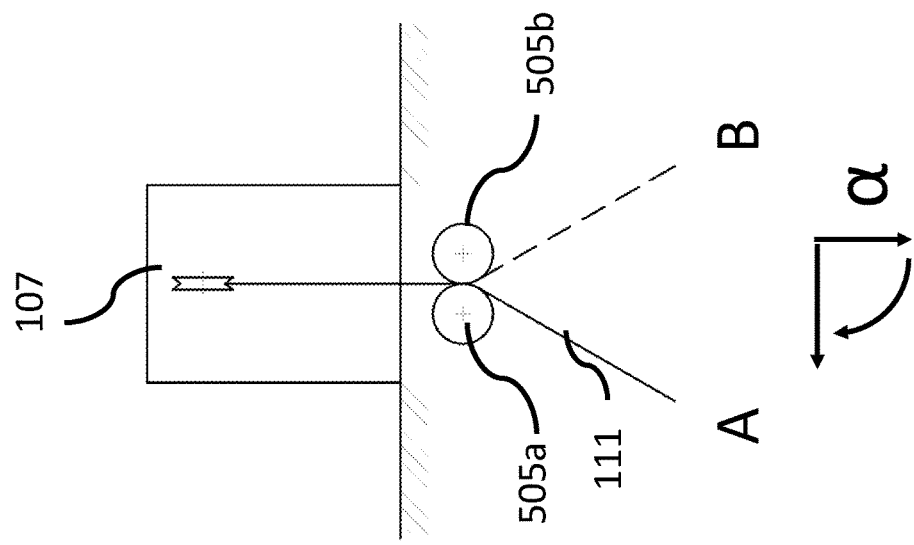
Figure 5C:
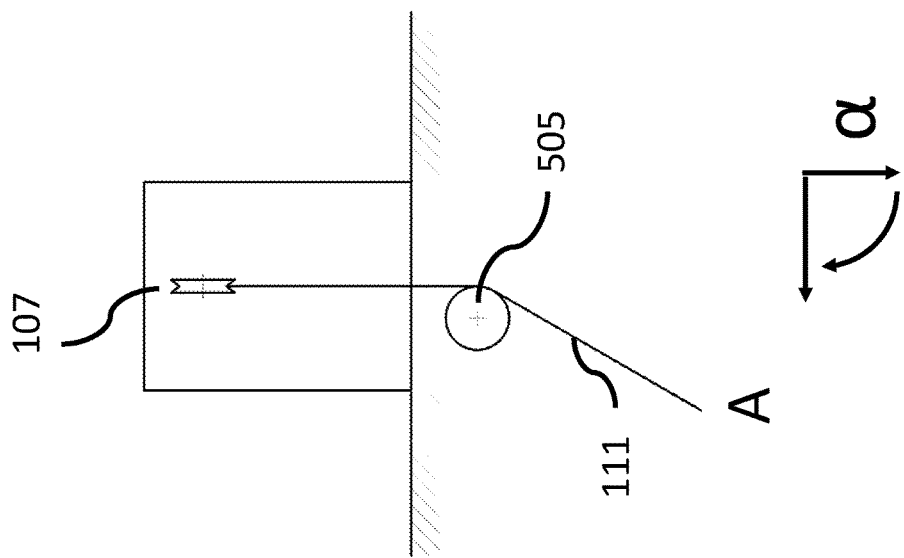

Referring now to FIGS. 5A-5C, high angle guide system 500 is described that utilizes a pulley, sheave, roller box, or similar device 505 that is located at or near the splashzone of the surface vessel or a distance X beneath water surface 1. In one embodiment, overboard guide system 500 may be substantially the same as overboard guide system 300. In one embodiment, the high angle system 500 may be coupled to a traditional A-frame system and overboard pulley 107 as described in relation to FIG. 1B. In some embodiments, one sheave 505 may be used (as shown in FIG. 5B), while in other embodiments multiple sheaves 505a, 505b may be utilized (as shown in FIG. 5C). FIG. 5A illustrates a view of the overboard system when looking down the side 102 of the vessel, while FIGS. 5B and 5C illustrate a view of the overboard system 500 when looking at a side of the surface vessel.

The objective of sheave 505 in one embodiment is to eliminate the offset lead angle that a standard deployment solution (such as a standard LARS system) has not been designed for. High angle overboard guide system 500 may or may not be coupled to a conventional cursor system (such as one similar to cursor system 105 shown in FIG. 1) to facilitate movement of the subsea device and deployment line from the LARS system from the back deck of the surface vessel to the splash zone. In one embodiment, high angle overboard system 500 may be substantially similar to overboard system 300 with sheave system 505 being substituted for high angle device 313. In other embodiments, high angle device 313 as described in FIG. 3 may take the form of turning sheave 505.

In one embodiment, turning sheave 505 may be arranged parallel to the length of the vessel. In this arrangement, pulley 107 on the LARS system is oriented in a first direction and the overboard sheave 505 is oriented in a second direction, which may be perpendicular to the first direction of pulley 107. While first pulley 107 is configured to deploy the subsea equipment from the surface vessel over a side of the vessel and into the water, overboard guide sheave 505 may be configured to allow the deployment line to operate at high angles relative to the surface vessel. As the normal direction of the vessel is forwards, the subsea equipment will generally be located behind the vessel, and thus in one embodiment guide sheave system 505 is arranged to counter the force exerted from the deployment line in a backwards direction. In some embodiments, overboard sheave system 505 may be coupled to a swivel joint that allows it to operate in 360 degrees, thereby countering the forces exerted from the deployment line in a plurality of directions (such as when the surface vessel changes directions or the subsea equipment moves in a different direction compared to the surface vessel). The direction of sheave 505 may be automatically rotated based on force applied from the deployment line or may be coupled to a control system on the surface vessel that is positioned at a particular degree or direction based on the intended or actual direction of the deployment line.

A LARS or similar winching system 109 may be located on the back deck of a surface vessel and (among other items) have a pulley or sheave system 107 that may be located off side 102 of the vessel by a certain distance so that any equipment lowered or raised via deployment line 111 does not hit the side of the vessel. On the side of the vessel may be located an overboard sheave system 505 that is coupled to the surface vessel via frame 515 or similar mounting structure. Thus, in one embodiment, high angle overboard system 500 may comprise overboard sheave 505 and frame 515, and in other embodiments may also comprise sheave system 107. Overboard sheave 505 may be located a distance from side 102 of the vessel, which may or may not be the same distance as pulley 107 is located from the vessel. Overboard sheave 505 may be located above water, below water, or near the splashzone or water surface in relation to the surface vessel. Overboard sheave 505 may be arranged to operate in a different direction than pulley 107, and in one embodiment is substantially perpendicular to the direction of pulley 107. For example, in one embodiment, pulley 107 is arranged for movement of the deployment line in a transverse direction from the side of the surface vessel (e.g., away from a side of the surface vessel), while sheave 505 is arranged for movement of the deployment line in a longitudinal direction from the side of the surface vessel.

In one embodiment, sheave structure 505 needs to travel or be hinged out of the way when the payload 113 (such as an ROV or basket, etc.) is lowered into the sea or raised back onboard. This can be a mechanical or automatic operation. In one embodiment, sheave 505 is configured for heave compensation and other movements of the ship, as the ship may yaw from side to side by up to 20 degrees or more and the deployment line can come out of the sheave grooves. For example, the sheave may be coupled to some type of vertical axis rotation or flagging system that automatically moves the sheave in a direction of the vessel to help maintain the deployment line in contact with the sheave.

In one embodiment, a first portion 111 of the deployment line 111 may extend between the LARS system and overboard guide system 505, and a second portion 111 of the deployment line may extend between overboard guide system 505 and subsea device 113. In one embodiment, the first deployment line portion is substantially vertical and the second deployment line portion has an angle alpha as it leaves the overboard guide system, which may vary based upon the speed of the vessel, depth of the subsea device, and direction of the deployment line relative to the surface vessel.

As shown in FIG. 5B, when the deployment line is routed across sheave 505 in a first direction A, sheave 505 provides a resistance force for the deployment line 111 and allows the deployment line to operate in a wide range of deployment angles, which is much higher than in prior art systems. The arrangement shown in FIG. 5B allows for resistive force for the deployment line when the subsea equipment is generally travelling behind the surface vessel. One of skill in the art may utilize any number of other arrangements based on the intended direction of the deployment line. In other embodiments, a swivel or other movement device may couple sheave 505 and mounting frame 515 to allow the sheave to rotate, which may or may not include a locking mechanism to keep the pulley in a substantially fixed position as appropriate.

As mentioned above, overboard sheave system 500 may comprise one or even two or more sheaves. FIG. 5C is substantially the same as FIG. 5B but includes a second overboard sheave. In one embodiment, overboard sheave system 500 comprises first sheave 505a and second sheave 505b mounted to side 102 of the surface vessel via mounting structure 515. The sheaves may be directly coupled together or spaced apart some distance with separate mounting structures. Sheaves 505a and 505b may be located at the same or different positions vertically and horizontally in relation to the surface vessel. Sheaves 505a and 505b may be oriented in the same or different directions. For example, as shown in FIG. 5C, sheave 505a is mounted in the same direction (and same vertical height) as sheave 505b but in a different position with respect to deployment line 111. In other words, each of the sheaves are mounted in opposing directions of the deployment line such that the deployment line passes between the sheaves. The configuration shown in FIG. 5C allows the deployment line to vary in different opposing directions during operation, such as direction A and direction B. In other embodiments, one or more additional sheaves may be used that are located in different directions from the deployment line to allow for different operational directions of the deployment line. One or both of the sheaves 505a, 505b may be coupled to a swivel or other rotational mechanism that allows the swivels to move in a plurality of directions such that the deployment line may travel up to 180 degrees or more in each direction and allow for 360 degrees of movement of the deployment line relative to the surface vessel.

Figure 6:
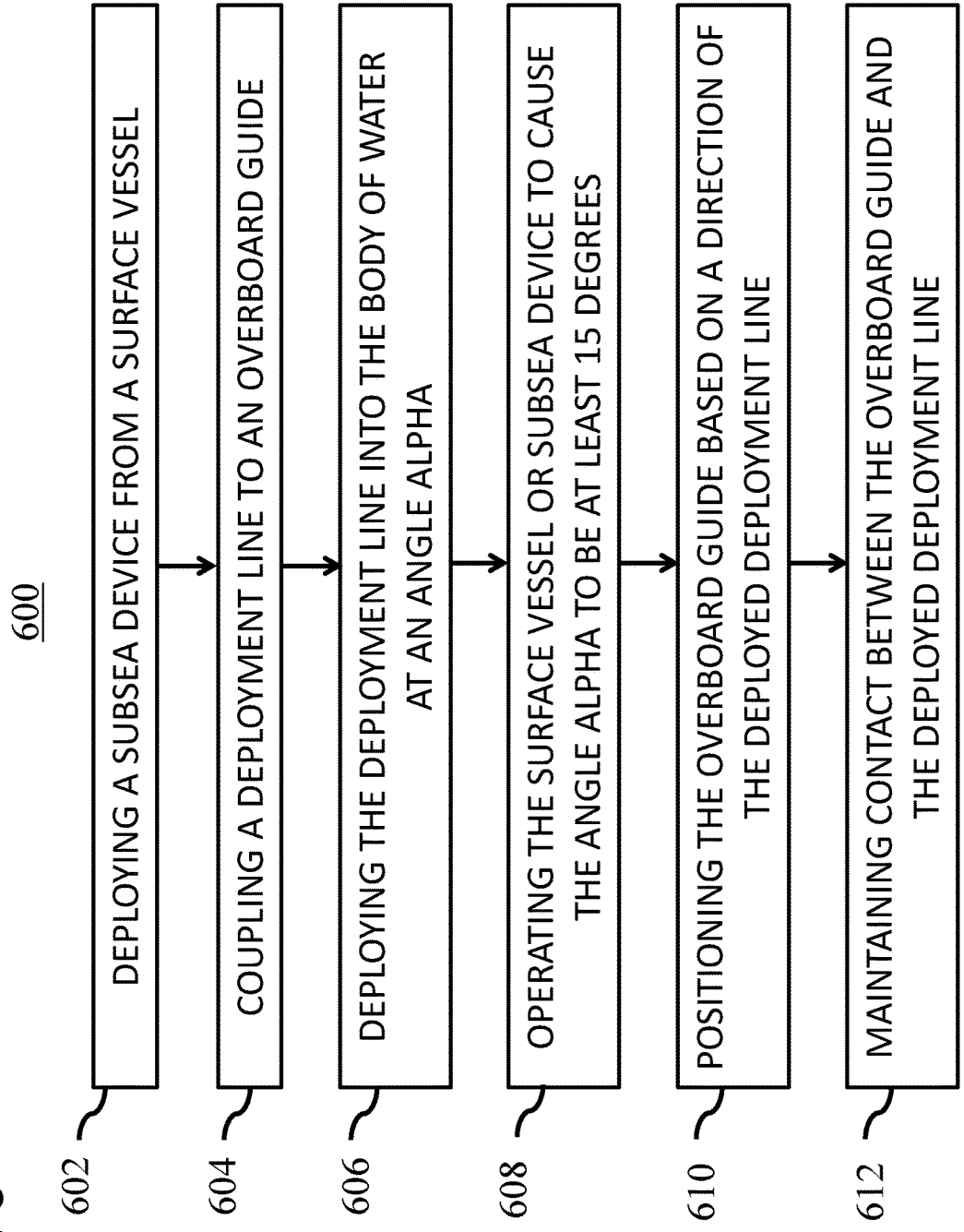
FIG. 6 illustrates one method of operation of a high angle overboard guide system.

FIG. 6 illustrates one method of operation for utilizing a high angle overboard guide system as described herein. In particular, FIG. 6 illustrates method 600 of deploying a deployment line at a high angle from a surface vessel while operating the vessel and/or subsea device coupled to the deployment line. In one embodiment, the deployment operation is directed to the deployment of a plurality of autonomous seismic nodes on or near the seabed utilizing one or more remotely operated vehicles and one or more subsea cages/baskets. While the disclosed method of use is directed to deployment operations, such as the deployment of seismic nodes on the ocean bottom, the method of use may also include certain retrieval operations, such as the retrieval of seismic nodes from the ocean bottom.

Step 602 comprises deploying a subsea device from a marine surface vessel. The subsea device is coupled to the surface vessel via a deployment line. For example, if the subsea device is an ROV, the deployment line may comprise a tether and an umbilical. The subsea device may be a ROV, UUV, underwater cage, basket, etc. The subsea device may or may not be a device used for the deployment and/or retrieval of seismic equipment, such as autonomous seismic nodes. The marine surface vessel may or may not be a seismic surface vessel. In one embodiment, subsea device 113 (such as a load, ROV, basket, or other subsea equipment) may be lowered via traditional methods over the side of the vessel, such as by the use of a conventional A-frame LARS system 103 (see FIG. 1B) or a conventional overboard cursor system (see FIG. 1A), which may be used to assist the lowering of the subsea device into the water without hitting the side of the vessel.

Step 604 comprises coupling a deployment line to an overboard guide of the surface vessel. In one embodiment, the deployment line is connected to the deployed subsea device in step 602. In some embodiments, the deployment line is connected to the overboard guide before the subsea device is deployed into the water, while in other embodiments the deployment line is connected to the overboard guide after the subsea device has been deployed into the water. The overboard guide may take any number of shapes and configurations as described herein, and may be coupled to a side of the surface vessel by a wide variety of coupling mechanisms. For example, it may be a cone or be cone-shaped, and may or may not include rollers or other similar friction reducing devices. The overboard guide may comprise a sheave or a plurality of sheaves. The overboard guide may or may not be able to rotate or move into a plurality of positions based on the intended or actual force, direction, and/or movement of the deployed deployment line. The overboard guide may be attached to a side of the surface vessel, such as being located near the splashzone of the surface vessel or a distance beneath a water surface, and may be coupled to a side of the vessel in a variety of mechanisms. In one embodiment, the coupling step may include inserting a portion of the deployment line into an opening of the overboard guide, while in other embodiments the coupling step may simply include positioning a portion of the deployment line adjacent and/or proximal to the overboard guide. In one embodiment, after the subsea device (such as an ROV) has been lowered a certain depth, the deployment line may be introduced to the overboard guide system or the overboard guide system may be put into the path of the deployment line over the vessel side. Once the overboard guide system is in place, which may be done manually or automatically, the A-Frame or similar structure of the LARS system on the back deck of the vessel may be positioned to line a launching pulley (such as pulley 107) into the appropriate position with the overboard guide. For example, if the overboard guide comprises one or more overboard sheaves (such as sheave 505 or plurality of sheaves 505a, 505b), the deployment line 111 (e.g., wire, umbilical, cable, etc.) from pulley 107 is effectively aligned with the overboard sheave(s). In some embodiments, the surface vessel may be accelerated to allow the deployment line to adopt a line of action that involves the outboard turning sheave. The vessel may continue to pay out the deployment line to achieve the desired depth or layback from the vessel launch and/or overboard point.

Step 606 comprises deploying the deployment line into the body of water at an angle alpha, which may be done before, during, or after coupling step 604. In one embodiment, a first portion of a deployment line (such as portion 111a) is located between a LARS system and the high angle guide system, and a second portion (such as portion 111b) of the deployment line is located between the high angle guide system and the subsea equipment. In one embodiment, first portion 111a has little to no angle and is substantially straight from the LARS system to the high angle overboard guide device, while second portion 111b of deployment line has an angle alpha as it exits through high angle overboard guide into the body of water. During initial operations (such as when the surface vessel is not travelling fast or the subsea equipment is not very deep), the angle alpha may be relatively small, such as between 0 and 10 or 15 degrees.

Step 608 comprises operating the surface vessel or subsea device in a manner to cause the deployment angle alpha to be at least 15 degrees. During standard operations of the surface vessel and/or subsea equipment, the angle alpha may have a plurality of ranges and/or sizes, based on the intended depth, speed, and/or location of the subsea equipment relative to the surface vessel. In the prior art, existing systems do not tolerate much more than a 15-degree angle for the deployment cables during standard operations, particularly when using A-frame LARS systems. Thus, in the prior art, the surface vessel cannot operate above a particular speed or deploy equipment at a certain depth or location if such an operational angle exceeds the system's requirements. In contrast, during operations using the disclosed high angle overboard device, during some or all of the subsea operations the subsea equipment may be deployed and operated during a point at which the deployment angle is at least 15 degrees. In some embodiments, the angle alpha may be at least 20 degrees, and in other embodiments it may be more than 25, 30, 45, or even 60 degrees. In some embodiments, substantially all of the subsea operations are performed at such a high angle. In some embodiments, the deployment angle may be greater than 15 or 20 degrees for one subsea equipment (such as an ROV), while the deployment angle for another subsea equipment (such as a basket) may be less than 15 degrees. In one embodiment, the method comprises performing subsea operations with the subsea device while the deployment angle alpha is at least 15 degrees, and in other embodiments comprises operating the surface vessel in a speed or direction that causes the angle alpha to be at least 15 degrees while simultaneously operating the subsea device.

Optionally, in one embodiment, method 600 may comprise step 610, which comprises positioning the overboard guide based on a direction of the deployed deployment line and/or step 612, which comprises maintaining contact between the overboard guide and the deployed deployment line. In some embodiments, the overboard guide may be substantially fixed in position during deployment of the deployed line. In situations where the subsea device is operated such that the deployment angle frequently changes or changes a significant amount, and in situations where the subsea device travels in a plurality of X, Y, and Z directions (such as any direction in a 360-degree orientation from the surface vessel), it may be desired to position the overboard guide to better maintain contact between the overboard guide and the deployed deployment line. This may include changing the shape of the overboard guide (such as restricting or enlarging a size of an exit opening of the guide), moving the overboard guide (or a portion thereof) in an X, Y, or Z direction to obtain better physical contact with a portion of the overboard guide and the deployment line, and/or rotating the overboard guide (or a portion thereof) to track the movement of the deployed deployment line and/or subsea device. Such movement, contact, and/or positioning of the deployment line may be done automatically or manually. In one embodiment, the overboard guide is coupled to a control system and/or a navigation system that automatically repositions this overboard guide based on intended or actual direction of the subsea device. In another embodiment, the overboard guide may be coupled to one or more sensors that measures the force exerted on the overboard guide by the deployment line and actively positions the overboard guide to minimize or maximize the exerted force on the overboard guide. In one embodiment, the method of use comprises operating the surface vessel in a direction or speed wherein a line of action of the deployment line continuously contacts the overboard guide system.

All of the methods disclosed and claimed herein can be made and executed without undue experimentation in light of the present disclosure. While the apparatus and methods of this invention have been described in terms of preferred embodiments, it will be apparent to those of skill in the art that variations may be applied to the methods and in the steps or in the sequence of steps of the method described herein without departing from the concept, spirit and scope of the invention. In addition, modifications may be made to the disclosed apparatus and components may be eliminated or substituted for the components described herein where the same or similar results would be achieved. All such similar substitutes and modifications apparent to those skilled in the art are deemed to be within the spirit, scope, and concept of the invention.

Many other variations in the configurations of the overboard guide are within the scope of the invention. For example, in some embodiments, only one high angle guide system is used, such as on one side of a marine vessel. In other embodiments, such as when multiple deployment lines are used, multiple overboard guide systems can be used for the multiple deployment lines; such systems can be located on a single side of a vessel or on multiple sides of a vessel. In still other embodiments, the overboard guide system may be located on the backside of the vessel or used in conjunction with a moon pool if the deployment line is deployed through the moonpool on a vessel. Further, more than one overboard sheave may be used for each deployment line. Still further, the overboard guide system may be used by itself and/or be coupled to a conventional cursor system and/or a traditional A-frame system. While the described overboard guide system is particularly useful for seismic operations that deploy one or more subsea devices (such as an ROV or basket, etc.), other marine operations may similarly be aided by the overboard systems described herein. It is emphasized that the foregoing embodiments are only examples of the very many different structural and material configurations that are possible within the scope of the present invention.

Although the invention(s) is/are described herein with reference to specific embodiments, various modifications and changes can be made without departing from the scope of the present invention(s), as presently set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

What is claimed is:

1. A method for the deployment of subsea equipment from a marine vessel, comprising:
deploying a remotely operated vehicle (ROV) from a surface vessel into a body of water from an A-frame deployment system located on a back deck of the marine vessel, wherein the remotely operated vehicle (ROV) is coupled to a deployment line;
coupling the deployment line to an overboard guide system, wherein the overboard guide system is located adjacent a starboard side or a port side of the surface vessel;
deploying the deployment line into the body of water at an angle alpha from the overboard guide system with the coupled ROV, wherein the angle alpha is approximately 15 degrees or greater, wherein the angle alpha is defined in relation to a vertical line perpendicular with the surface vessel, wherein the angle alpha is caused by relative movement of the ROV and the surface vessel;
deploying the ROV near the seabed while the deployment angle alpha is at least 15 degrees;
moving the surface vessel in a direction while deploying the ROV; and
deploying a plurality of ocean bottom seismic nodes on the seabed with the ROV while the deployment angle alpha is at least 15 degrees.

2. The method of claim 1, wherein the angle alpha is approximately 20 degrees or greater.

3. The method of claim 1, wherein the overboard guide system is located at a splashzone of the surface vessel with a water surface or beneath a water surface.

4. The method of claim 1, wherein the overboard guide system comprises a first opening and a second opening, wherein the deployment line is configured to enter the overboard guide system through the first opening and exit the overboard guide system through the second opening.

5. The method of claim 1, wherein the overboard guide system is substantially in the shape of a cone.

6. The method of claim 1, wherein a plurality of rollers is coupled to an interior portion of the overboard guide system.

7. The method of claim 1, wherein the overboard guide system comprises at least one sheave.

8. The method of claim 1, wherein the overboard guide system comprises a plurality of sheaves, wherein at least a first sheave is arranged opposite to a second sheave.

9. The method of claim 1, wherein the overboard guide system is configured to deploy the deployment line approximately 360 degrees around the surface vessel.

10. The method of claim 1, wherein the overboard guide system is configured to change its position in response to a force of the deployment line.

11. The method of claim 1, wherein the overboard guide system is configured to change its position to maintain a substantially continuous contact between the overboard guide system and the deployment line.

12. The method of claim 1, further comprising operating the surface vessel in a direction wherein a line of action of the deployment line continuously contacts the overboard guide system.

13. The method of claim 1, further comprising maintaining substantially continuous contact between the overboard guide system and the deployment line.

14. The method of claim 1, further comprising automatically positioning the overboard guide system in response to a force of the deployment line on the overboard guide system.

15. The method of claim 1, further comprising automatically positioning the overboard guide system in response to movement of the surface vessel.

16. The method of claim 1, further comprising automatically measuring the force applied to the overboard guide system by movement of the deployment line with one or more sensors coupled to the overboard guide system.

17. The method of claim 1, wherein the movement of the surface vessel causes the deployment angle to be at least 15 degrees.

18. A method for the deployment of seismic nodes from a marine vessel, comprising:
  launching a remotely operated vehicle (ROV) from a surface vessel into a body of water from a ROV deployment system located on a back deck of the marine vessel and an overboard guide system located adjacent a port side or a starboard side of the surface vessel, wherein the remotely operated vehicle (ROV) is coupled to the surface vessel via a deployment line;
  deploying a plurality of seismic nodes on the seabed by the ROV while the deployment line exits the overboard guide system at an angle alpha of approximately 15 degrees or greater, wherein the angle alpha is defined in relation to a vertical line perpendicular with the surface vessel;
  deploying the ROV near the seabed with the plurality of seismic nodes while the deployment angle alpha is at least 15 degrees; and
  moving the surface vessel in a direction while deploying the ROV.

19. The method of claim 18, wherein the angle alpha is caused by relative movement of the ROV and the surface vessel.

20. The method of claim 18, wherein the ROV deployment system is an A-frame deployment system.

21. The method of claim 18, wherein the angle alpha is approximately 20 degrees or greater.

22. The method of claim 18, wherein the movement of the surface vessel causes the deployment angle to be at least 15 degrees.

* * * * *